(12) United States Patent
Kato et al.

(10) Patent No.: US 8,847,528 B2
(45) Date of Patent: Sep. 30, 2014

(54) CONTROL APPARATUS AND CONTROL METHOD FOR AC ROTARY MACHINE

(75) Inventors: Sho Kato, Tokyo (JP); Hisanori Yamasaki, Tokyo (JP); Masaki Kono, Tokyo (JP); Keita Hatanaka, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 73 days.

(21) Appl. No.: 13/809,674

(22) PCT Filed: Jul. 23, 2010

(86) PCT No.: PCT/JP2010/004726
§ 371 (c)(1),
(2), (4) Date: Jan. 11, 2013

(87) PCT Pub. No.: WO2012/011155
PCT Pub. Date: Jan. 26, 2012

(65) Prior Publication Data
US 2013/0113399 A1    May 9, 2013

(51) Int. Cl.
*H02P 21/00*   (2006.01)

(52) U.S. Cl.
USPC ............ 318/400.02; 318/400.09; 318/400.13; 318/400.3; 318/430

(58) Field of Classification Search
USPC .......... 318/400.02, 400.09, 400.13, 430, 434
See application file for complete search history.

(56) References Cited

U.S. PATENT DOCUMENTS

| | | | |
|---|---|---|---|
| 5,608,300 A | 3/1997 | Kawabata et al. | |
| 5,847,523 A * | 12/1998 | Rappenecker et al. | 318/434 |
| 8,022,660 B2 * | 9/2011 | Kinpara et al. | 318/812 |
| 2006/0082336 A1 | 4/2006 | Kurosawa et al. | |
| 2009/0015182 A1 * | 1/2009 | Kariatsumari et al. | 318/400.02 |
| 2009/0160380 A1 * | 6/2009 | Yamada et al. | 318/400.15 |
| 2009/0230901 A1 * | 9/2009 | Amano | 318/400.3 |
| 2009/0237021 A1 * | 9/2009 | Yamamoto et al. | 318/400.15 |
| 2009/0237022 A1 * | 9/2009 | Yamamoto et al. | 318/400.26 |
| 2009/0251083 A1 * | 10/2009 | Kinpara et al. | 318/400.11 |
| 2009/0322264 A1 * | 12/2009 | Imura | 318/400.09 |
| 2010/0026220 A1 * | 2/2010 | Sakai | 318/400.17 |

(Continued)

FOREIGN PATENT DOCUMENTS

| | | |
|---|---|---|
| JP | 7 177788 | 7/1995 |
| JP | 2005 65410 | 3/2005 |
| JP | 2006 115599 | 4/2009 |

OTHER PUBLICATIONS

U.S. Appl. No. 13/809,215, filed Jan. 9, 2013, Kato, et al.

(Continued)

*Primary Examiner* — Paul Ip
(74) *Attorney, Agent, or Firm* — Oblon, Spivak, McClelland, Maier & Neustadt, L.L.P.

(57) ABSTRACT

A control apparatus for an AC rotary machine includes a control circuit, a power converter, a current detector, and a voltage detector. The control circuit includes: an activation current instruction unit which generates a current instruction for activation; and a start phase setting unit which sets an initial rotation phase for activation control, based on the rotation direction of the AC rotary machine just after activation and on the polarity of current detected by the current detector just after activation. Thus, the current amplitude and torque shock just after activation control is started can be reduced, and assured and stable reactivation is allowed without causing the protection operation.

7 Claims, 14 Drawing Sheets

(56) References Cited

U.S. PATENT DOCUMENTS

| | | | |
|---|---|---|---|
| 2010/0164416 A1* | 7/2010 | Yamada | 318/400.13 |
| 2010/0295494 A1* | 11/2010 | Takeuchi et al. | 318/504 |
| 2011/0012544 A1* | 1/2011 | Schulz et al. | 318/400.02 |
| 2011/0018578 A1* | 1/2011 | Bae et al. | 324/764.01 |
| 2011/0133744 A1* | 6/2011 | Ono et al. | 324/430 |
| 2011/0140642 A1* | 6/2011 | Kono et al. | 318/139 |
| 2011/0175558 A1* | 7/2011 | Kitanaka | 318/400.3 |
| 2011/0181231 A1* | 7/2011 | Ito et al. | 318/801 |
| 2011/0241583 A1* | 10/2011 | He et al. | 318/400.09 |
| 2011/0241584 A1* | 10/2011 | He et al. | 318/400.09 |
| 2011/0248663 A1* | 10/2011 | Yamakawa et al. | 318/805 |
| 2011/0273125 A1* | 11/2011 | Yamada et al. | 318/503 |
| 2011/0279071 A1* | 11/2011 | Yamada | 318/400.02 |
| 2012/0019176 A1* | 1/2012 | Okamura | 318/376 |
| 2012/0032620 A1* | 2/2012 | Shimada et al. | 318/400.09 |
| 2012/0068646 A1* | 3/2012 | Takamatsu et al. | 318/400.26 |
| 2012/0139460 A1* | 6/2012 | Senkou et al. | 318/400.02 |
| 2012/0173066 A1* | 7/2012 | Yamada et al. | 701/22 |

OTHER PUBLICATIONS

U.S. Appl. No. 13/809,451, filed Jan. 10, 2013, Kato, et al.
International Search Report Issued Oct. 5, 2010 in PCT/JP10/04726 Filed Jul. 23, 2010.

* cited by examiner

FIG. 7

IN FORWARD ROTATION

| CONDUCTION START PHASE [DEGREE] | iu | iv | iw |
|---|---|---|---|
| 0 | POSITIVE | NEGATIVE | POSITIVE |
| 60 | POSITIVE | NEGATIVE | NEGATIVE |
| 120 | POSITIVE | POSITIVE | NEGATIVE |
| 180 | NEGATIVE | POSITIVE | NEGATIVE |
| 240 | NEGATIVE | POSITIVE | POSITIVE |
| 300 | NEGATIVE | NEGATIVE | POSITIVE |

(a)

IN REVERSE ROTATION

| CONDUCTION START PHASE [DEGREE] | iu | iv | iw |
|---|---|---|---|
| 0 | NEGATIVE | POSITIVE | NEGATIVE |
| 60 | NEGATIVE | POSITIVE | POSITIVE |
| 120 | NEGATIVE | NEGATIVE | POSITIVE |
| 180 | POSITIVE | NEGATIVE | POSITIVE |
| 240 | POSITIVE | NEGATIVE | NEGATIVE |
| 300 | POSITIVE | POSITIVE | NEGATIVE |

IN FORWARD ROTATION

| CONDUCTION START PHASE [DEGREE] | id | iq |
|---|---|---|
| 0 | POSITIVE | NEGATIVE |
| 90 | POSITIVE | POSITIVE |
| 180 | NEGATIVE | NEGATIVE |
| 270 | NEGATIVE | POSITIVE |

(b)

IN REVERSE ROTATION

| CONDUCTION START PHASE [DEGREE] | id | iq |
|---|---|---|
| 0 | NEGATIVE | POSITIVE |
| 90 | NEGATIVE | NEGATIVE |
| 180 | POSITIVE | POSITIVE |
| 270 | POSITIVE | NEGATIVE |

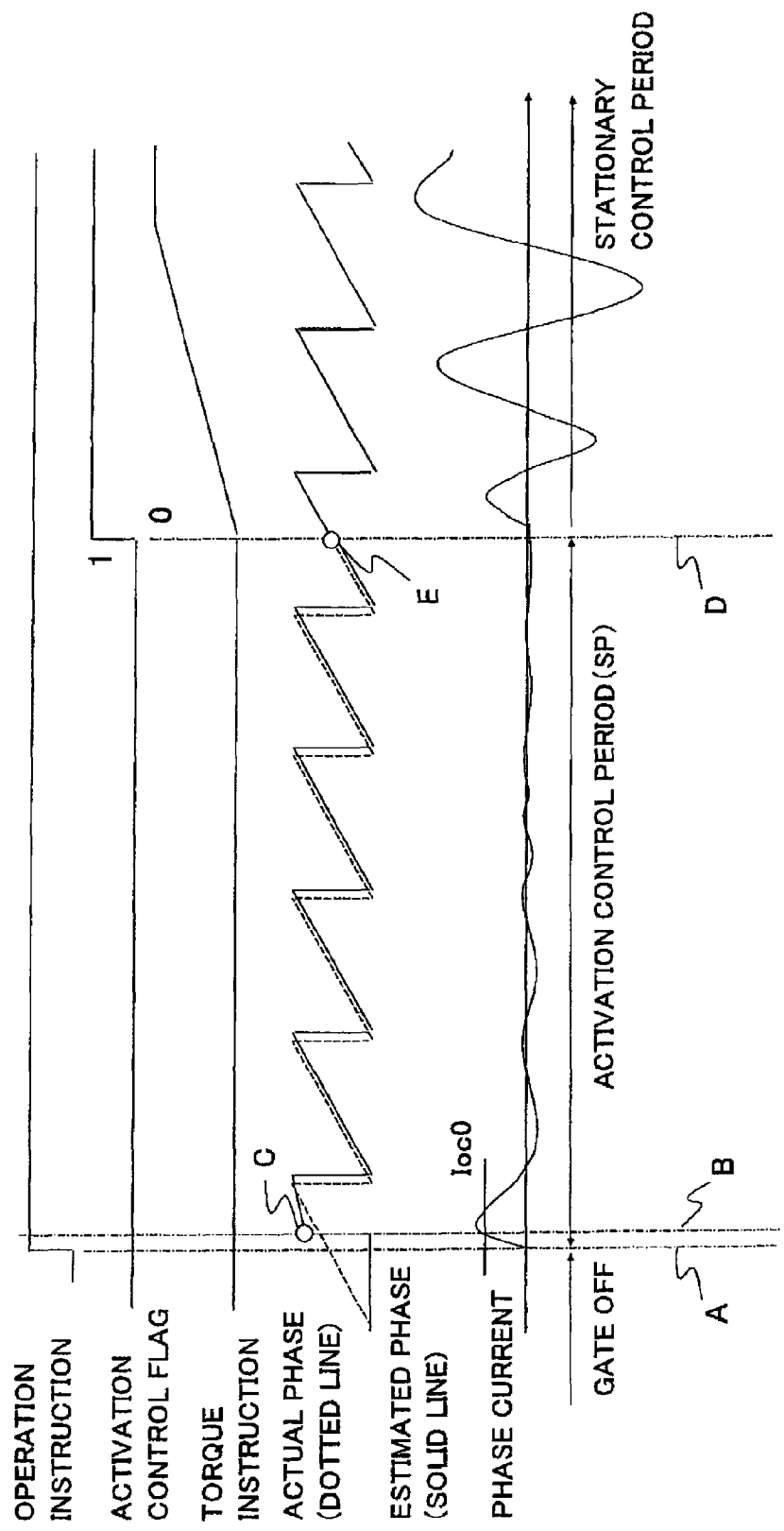

CONTROL APPARATUS AND CONTROL METHOD FOR AC ROTARY MACHINE

TECHNICAL FIELD

The present invention relates to a control apparatus for an AC rotary machine, which controls an AC rotary machine, particularly, a synchronous machine using permanent magnet by an inverter in a position-sensorless manner, and more particularly, relates to a control apparatus for an AC rotary machine, which allows assured and stable reactivation of the AC rotary machine over the entire rotation rate region from zero to a high speed.

BACKGROUND ART

In the case of controlling the output torque of an AC rotary machine with high accuracy, it was necessary to provide a rotor position sensor for applying current based on the rotor position of the AC rotary machine. However, the rotor position sensor has restriction of placement due to its relatively large volume, and there is trouble on wiring of control transmission lines for transmitting sensor output to a control apparatus, leading to increase in failure factors such as disconnection. Meanwhile, the rotor position can be indirectly obtained by detecting induced voltage occurring during rotation of the AC rotary machine, and so-called sensorless vector control which performs torque control based on the rotor position with high speed and high accuracy is already being put into practical use. In the sensorless vector control, generally, the induced voltage is estimated and calculated from an inverter voltage instruction applied to the AC rotary machine and a current detected value flowing in the AC rotary machine. However, before the operation of the inverter is started, the motor rotor position cannot be obtained. Particularly, in the case where the AC rotary machine rotates at a high speed and the induced voltage amplitude is large, when the inverter is reactivated, unnecessary torque occurs due to unstable current control, or in the worst case, overcurrent protection operation is performed, whereby reactivation may become impossible.

To solve such problems, a technique of Patent Document 1 is proposed.

In the technique of Patent Document 1, during a certain period from reactivation of an inverter, sensorless control is not performed but only current feedback control is performed. An approximate value of a motor rotation rate is estimated from the rotation rate of a voltage vector or a current vector obtained during the above certain period, and then sensorless control is started with the estimated value set as an initial value. Thus, even when a permanent magnet motor is rotating at a high speed, the inverter is smoothly reactivated.

CITATION LIST

Patent Document

Patent Document 1: Japanese Laid-Open Patent Publication No. 2005-065410 (Paragraph [0011] and FIG. 1)

SUMMARY OF THE INVENTION

Problems to be Solved by the Invention

However, a method of performing only current feedback control and estimating an approximate value of the motor rotation rate from the rotation rate of the voltage vector or the current vector obtained during the current feedback control as in the technique of Patent Document 1, has the following problems. That is, when the motor rotates at a high speed, if only the current feedback control is performed while an initial phase is not obtained, the induced voltage vector of the motor and the output voltage vector of the inverter are not matched, so that excessive current flows at the start of activation control and unnecessary torque occurs. In the worst case, the control can become unstable.

The present invention has been made to solve the above problems, and an object of the present invention is to provide a control apparatus for an AC rotary machine, capable of assured and stable reactivation of position sensorless vector control for an AC rotary machine, particularly, a permanent magnet motor.

Solution to the Problems

A control apparatus for an AC rotary machine according to the present invention includes: a control circuit which generates a voltage instruction based on a current instruction and generates a switching instruction based on the voltage instruction; a power converter which generates AC voltage having controlled amplitude and controlled angular frequency, based on the switching instruction; and a current detector which detects AC phase current flowing in the AC rotary machine driven by the output of the power converter, wherein the control circuit has: an activation current instruction unit which generates a current instruction for activation; and a start phase setting unit which sets an initial rotation phase for activation control, based on the rotation direction of the AC rotary machine just after activation and on the polarity of the current detected by the current detector just after activation.

Effect of the Invention

The control circuit of the control apparatus for an AC rotary machine according to the present invention has: the activation current instruction unit which generates a current instruction for activation; and the start phase setting unit which sets an initial rotation phase for activation control, based on the rotation direction of the AC rotary machine just after activation and on the polarity of the current detected by the current detector just after activation. Therefore, occurrence of excessive current and torque shock just after activation control is started can be reduced, and assured and stable reactivation is allowed without causing the protection operation.

BRIEF DESCRIPTION OF THE DRAWINGS

FIG. 7 is a diagram showing the relationship between the phase and the phase current of the start phase setting unit of the control apparatus for an AC rotary machine according to embodiment 1 of the present invention.

FIG. 10 is a diagram showing the relationship between the phase and the axis current of a start phase setting unit of the control apparatus for an AC rotary machine according to embodiment 2 of the present invention.

FIG. 15 is a block diagram showing the operation in activation control of the control apparatus for an AC rotary machine according to embodiment 3 of the present invention.

DESCRIPTION OF EMBODIMENTS

Embodiment 1

Figure 1:
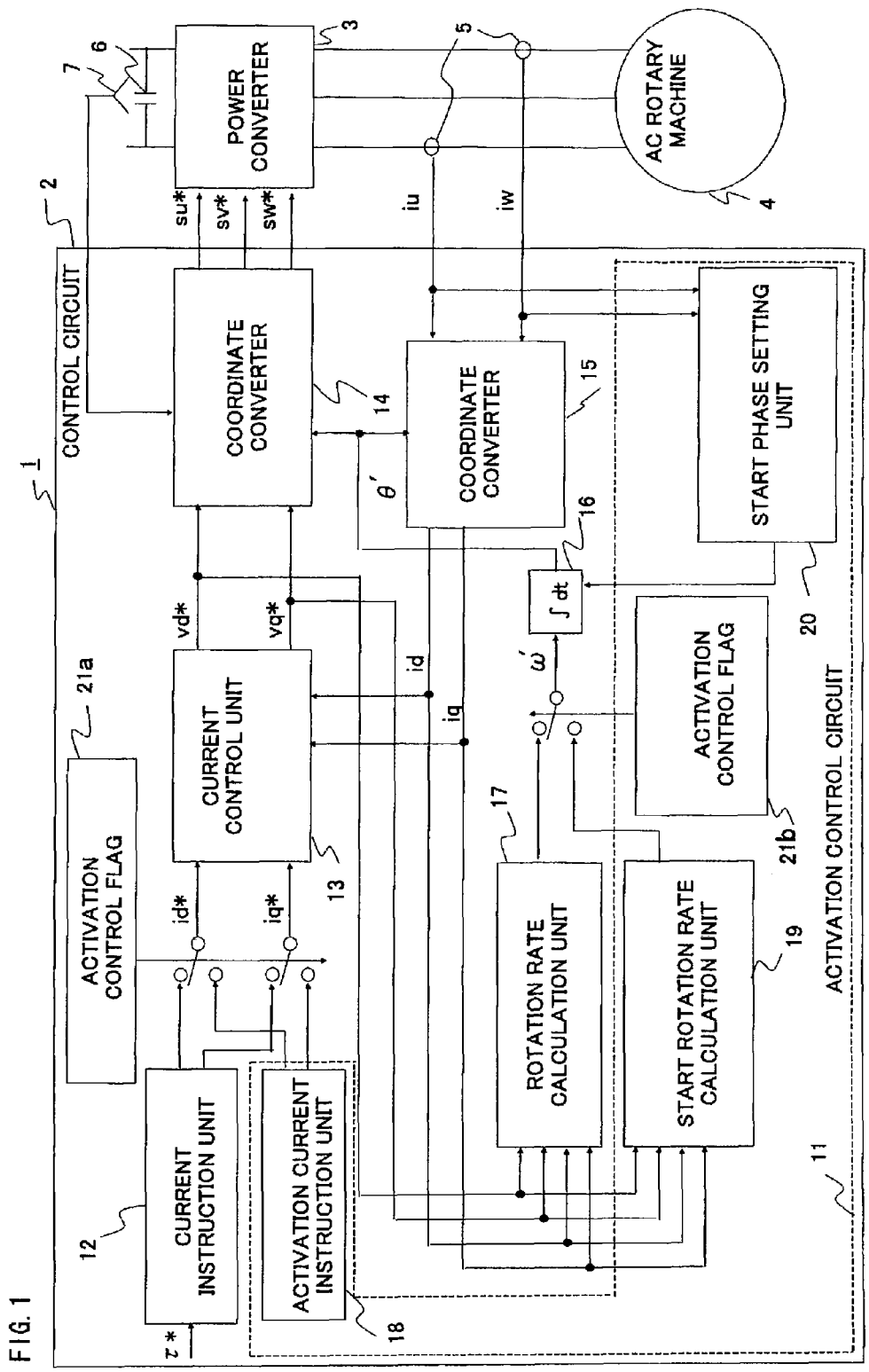
FIG. 1 is a block diagram showing the configuration of a control apparatus for an AC rotary machine according to embodiment 1 of the present invention.
Figure 2:
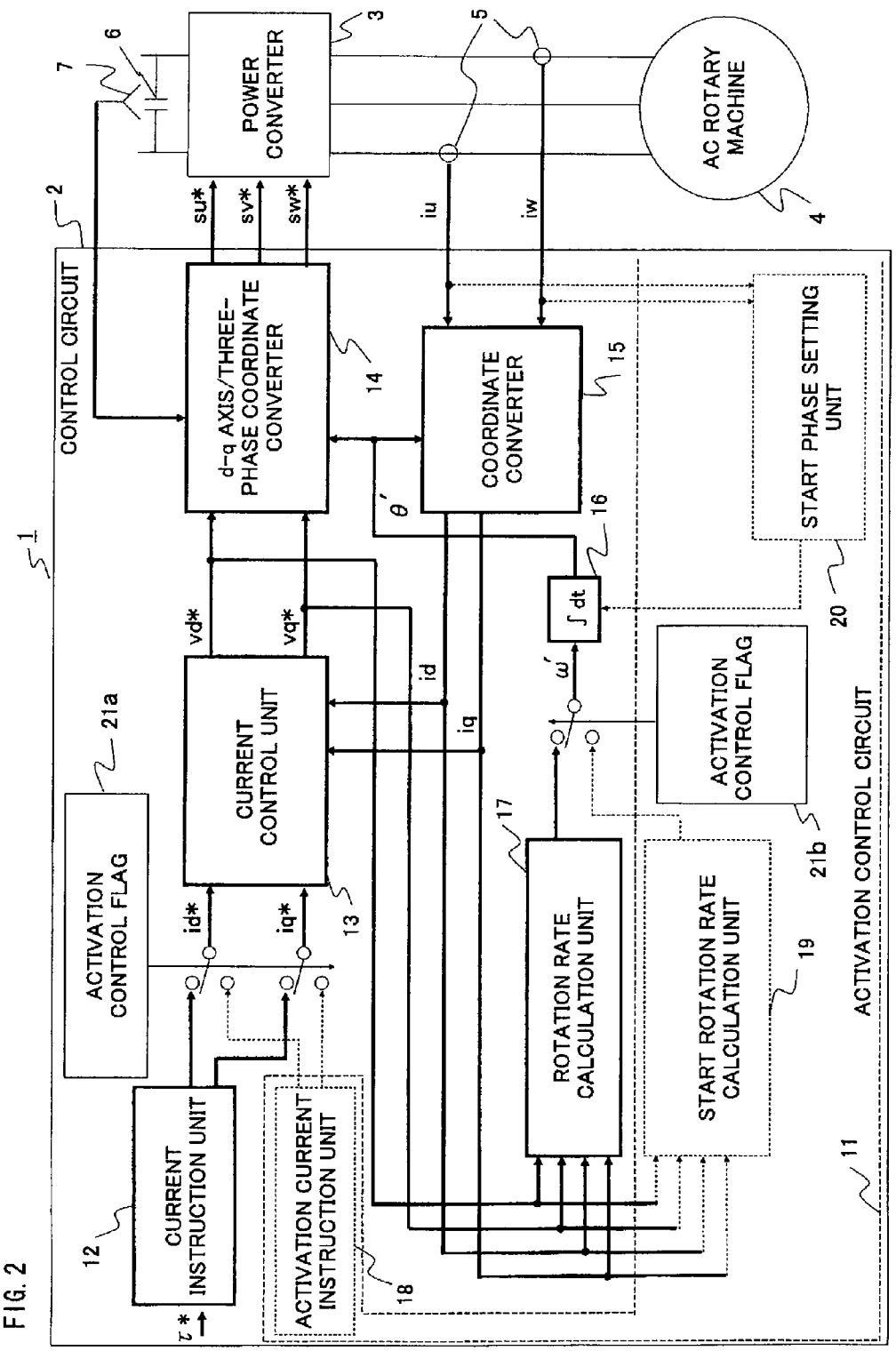
FIG. 2 is a block diagram showing the operation in stationary control of the control apparatus for an AC rotary machine according to embodiment 1 of the present invention.
Figure 3:
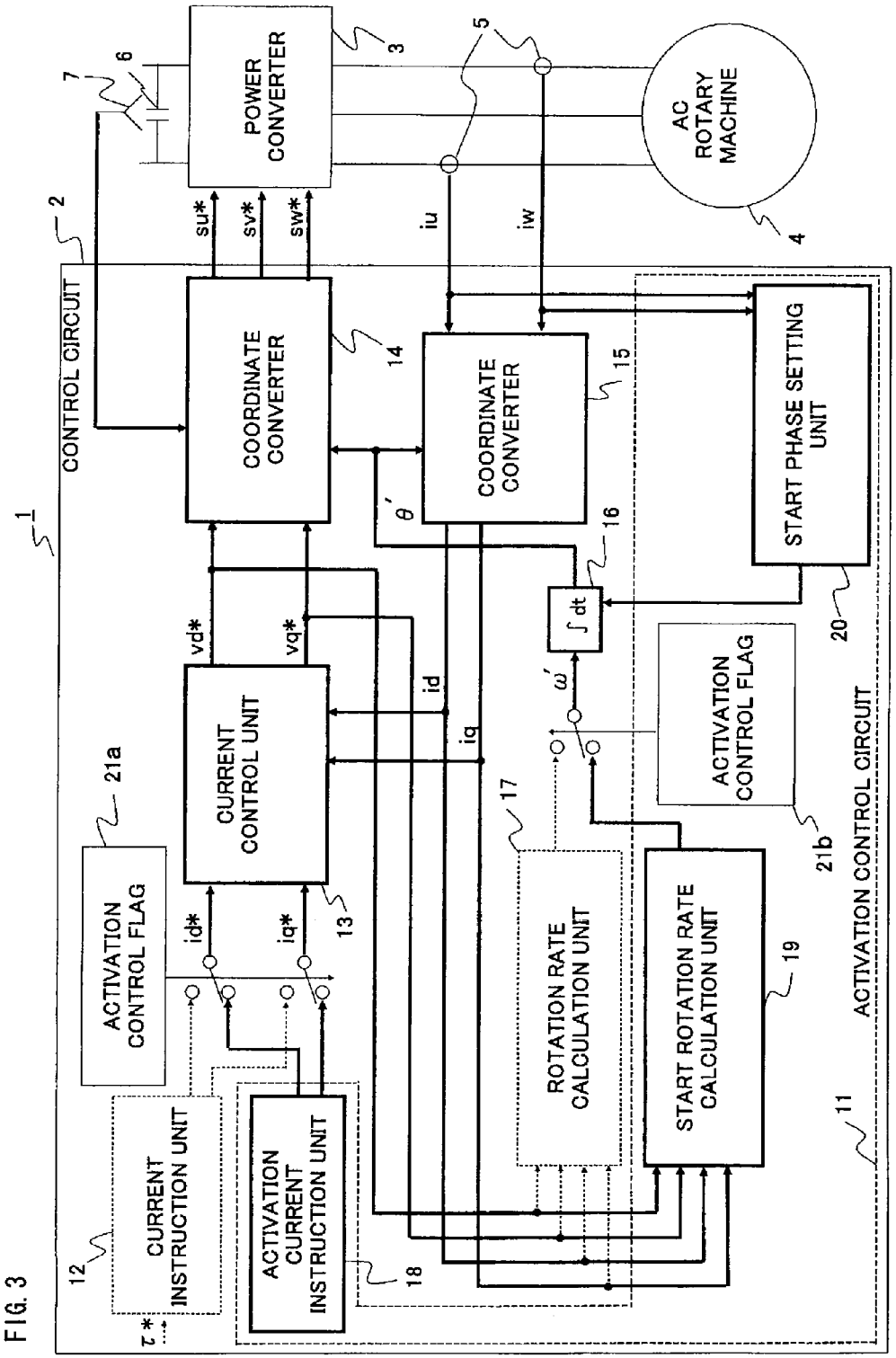
FIG. 3 is a block diagram showing the operation in activation control of the control apparatus for an AC rotary machine according to embodiment 1 of the present invention.

Hereinafter, embodiment 1 of the present invention will be described based on the drawings. FIG. 1 is a block diagram showing the configuration of a control apparatus 1 for an AC rotary machine according to embodiment 1 of the present invention. FIGS. 2 and 3 are block diagrams showing the operation of the control apparatus 1 for an AC rotary machine. FIGS. 4 to 8 are diagrams for explaining the configurations and operations of major constituent circuits.

Hereinafter, the configuration of the control apparatus 1 for an AC rotary machine according to embodiment 1 of the present invention will be described based on FIG. 1.

The control apparatus 1 for an AC rotary machine includes a control circuit 2, a power converter 3, a current detector 5, a smoothing capacitor 6, and a voltage detector 7, and controls an AC rotary machine 4.

The power converter 3 is, for example, a three-phase power converter, and performs power conversion between DC power and three-phase AC power. The power converter 3 has three-phase conversion circuits for U, V, and W phases connected, in parallel with each other, to a DC power supply (not shown). The conversion circuit for each phase has a pair of switches on the positive and negative sides, and three-phase AC feed paths Iu, Iv, and Iw are connected between the respective pairs of switches. Specifically, the power converter 3 is a three-phase power converter of variable-voltage and variable-frequency type.

When converting DC power to three-phase AC power, the power converter 3 receives switching instructions su*, sv*, and sw* from the control circuit 2, and based on the switching instructions, generates three-phase AC power having controlled output voltage and controlled angular frequency. The switching instructions su*, sv*, and sw* are supplied to the conversion circuits for U, V, and W phases of the power converter 3, thereby turning on or off the respective pairs of switches of the conversion circuits in accordance with controlled phases.

The AC rotary machine (motor) 4 is a synchronous electric motor using permanent magnet, and is connected to the power converter 3 via the AC feed paths Iu, Iv, and Iw for three phases.

The current detector 5 is provided on, for example, the AC feed paths Iu and Iw, and detects AC phase current flowing from the power converter 3 to the synchronous electric motor 4, that is, detects U-phase current iu and W-phase current iw, thereby calculating the other V-phase current iv using a relationship of iu+iv+iw=0.

The voltage detector 7 detects DC voltage Vdc on the input side applied to the power converter 3. For example, as the voltage detector 7, a voltage sensor that detects the voltage of the smoothing capacitor 6 provided on the input side of the power converter 3 is used.

The control circuit 2 is composed of a circuit relevant to sensorless vector control for stationary control, and an activation control circuit 11 relevant to activation control.

The circuit relevant to stationary control has: a current instruction unit 12 which generates current instructions id* and iq* from a torque instruction τ*; a current control unit 13 which converts the current instructions id* and iq* to voltage instructions vd* and vq*; coordinate converters 14 and 15; a rotation rate calculation unit 17 which estimates the rotation rate, that is, the rotation angular frequency of the AC rotary machine 4 needed for sensorless vector control, from the voltage instructions vd* and vq* and current detected values id and iq; and an integrator 16 which calculates an estimated rotation phase θ' from the estimated value of the rotation angular frequency.

Besides common circuits with the circuit relevant to stationary control, the activation control circuit 11 has: an activation current instruction unit 18; a start rotation rate calculation unit 19 which estimates an operation start rotation rate, that is, an operation start rotation angular frequency, from the voltage instructions vd* and vq* and the current detected values id and iq; and a start phase setting unit 20 which sets a conduction start rotation phase for starting activation control, based on the current detected values iu and iw.

Switching between stationary control and activation control is performed by activation control flags 21a and 21b (hereinafter, collectively referred to as 21). Specifically, inputs from the current instruction unit 12 and the activation current instruction unit 18 to the current control unit 13, and inputs from the rotation rate calculation unit 17 and the start rotation rate calculation unit 19 to the integrator 16, are switched by the respective activation control flags 21.

Next, the operation of the control apparatus 1 for an AC rotary machine will be described. Specifically, first, the operation in the sensorless vector control for the stationary control will be described, and then the operation in the activation control will be described.

The operation of the control apparatus 1 for an AC rotary machine in the stationary control will be described based on FIG. 2.

The stationary control by the control apparatus 1 for an AC rotary machine is performed through solid-line paths shown in FIG. 2.

The current instruction unit 12 receives the torque instruction θ* to generate the current instructions id* and iq*, and supplies the generated current instructions id* and iq* to the current control unit 13.

The current control unit 13 receives the current instructions id* and iq* from the current instruction unit 12, and the d-axis detected current id and the q-axis detected current iq from the coordinate converter 15 described later, and generates the d-axis voltage instruction vd* and the q-axis voltage instruction vq* so as to make the d-axis detected current id equal to the d-axis current instruction id* and make the q-axis detected current iq equal to the q-axis current instruction iq*.

The coordinate converter 14 is a coordinate converter that performs conversion from a rotational two-axis coordinate system having a d-axis and a q-axis perpendicular to each other to a three-phase time coordinate system. The coordinate converter 14 receives the voltage instructions vd* and vq* from the current control unit 13, the estimated rotation phase θ' from the integrator 16 described later, and the voltage detected value Vdc from the voltage detector 7, and generates the switching instructions su*, sv*, and sw*. The generated switching instructions su*, sv*, and sw* are supplied to the power converter 3.

The coordinate converter 15 is a coordinate converter that performs conversion from a three-phase time coordinate system to a rotational two-axis coordinate system having a d-axis and a q-axis perpendicular to each other. The coordinate converter 15 receives the detected currents iu and iw from the current detector 5 and the estimated rotation phase θ' from the integrator 16 described later, and converts these currents to the d-axis detected current id and the q-axis detected current iq in a rotational two-axis coordinate system having a d-axis and a q-axis perpendicular to each other.

The integrator 16 calculates the estimated rotation phase θ' from an estimated rotation angular frequency ω' calculated by the rotation rate calculation unit 17, by integrating the estimated rotation angular frequency ω', and supplies the estimated rotation phase θ' to the coordinate converter 14 and the coordinate converter 15.

The rotation rate calculation unit 17 calculates the estimated rotation angular frequency w' based on the d-axis detected current id and the q-axis detected current iq in the rotational two-axis coordinate system, and on the voltage instructions vd* and vq*, and supplies the estimated rotation angular frequency ω' to the integrator 16.

It is noted that in order to start the operation of the AC rotary machine 2 based on the configuration shown in FIG. 2, it is necessary to set an operation start rotation phase as the initial value for the integrator 16, and an operation start rotation angular frequency as the initial value for the rotation rate calculation unit 17. The setting of the initial values will be described in the following description of the operation in activation control.

Next, the operation of the control apparatus 1 for an AC rotary machine in activation control will be described based on FIGS. 3 to 8.

The activation control by the control apparatus 1 for an AC rotary machine is performed through solid-line paths shown in FIG. 3.

The activation control is performed when, from the free-run state of the AC rotary machine 4 after the power conversion operation of the power converter 3 is stopped, the power converter 3 is activated to start the power conversion operation and the AC rotary machine 4 is activated by the power converter 3. Specifically, the activation control period is a period of SP [sec] from the time of activating the power converter 3, and the activation control is performed based on the configuration shown by the solid lines in FIG. 3, whereby the operation start rotation phase and the operation start rotation angular frequency are calculated. Then, at the end of the activation control period, the control is switched to the configuration shown by the solid lines in FIG. 2, to shift to the stationary control.

Here, SP [sec] is a period of several tens of milliseconds to several hundreds of milliseconds. In embodiment 1, SP is set at 100 [msec], for example.

The activation current instruction unit 18 generates the current instructions id* and iq* during the activation control. The current instructions have instruction values that prevent the AC rotary machine 4 from causing torque during the activation control. For example, the current instructions are set as id*=0 and iq*=0. It is noted that id* does not necessarily need to be zero.

The activation current instruction unit 18 supplies the current instructions id* and iq* to the current control unit 13.

The current control unit 13 receives the current instructions id* and iq* from the activation current instruction unit 18, and the d-axis detected current id and the q-axis detected current iq from the coordinate converter 15, and generates the d-axis voltage instruction vd* and the q-axis voltage instruction vq* so as to make the d-axis detected current id equal to the d-axis current instruction id* and make the q-axis detected current iq equal to the q-axis current instruction iq*.

The coordinate converter 14 receives the voltage instructions vd* and vq* from the current control unit 13, the estimated rotation phase θ' from the integrator 16, and the voltage detected value Vdc from the voltage detector 7, and generates the switching instructions su*, sv*, and sw*. The generated switching instructions su*, sv*, and sw* are supplied to the power converter 3.

The coordinate converter 15 receives the detected currents iu and iw from the current detector 5 and the estimated rotation phase θ' from the integrator 16, and converts these currents to the d-axis detected current id and the q-axis detected current iq in a rotational two-axis coordinate system having a d-axis and a q-axis perpendicular to each other.

In the activation control period SP, the AC phase currents iu, iv, and iw flowing from the power converter 3 to the AC rotary machine 4 are controlled to be zero. Therefore, unnecessary torque does not occur during the activation control, and the AC rotary machine 4 can be stably activated.

Next, a calculation method for the estimated rotation phase to be supplied to the coordinate converter 14 and the coordinate converter 15 will be described.

The start rotation rate calculation unit 19 estimates the operation start rotation angular frequency ω' for the stationary control, from the voltage instructions vd* and vq* and the current detected values id and iq in the activation control. The operation start rotation angular frequency ω' estimated is integrated by the integrator 16, thereby estimating the phase to be supplied to the coordinate converters 14 and 15 during the activation control, that is, estimating the rotation phase of the AC rotary machine.

In the case where the AC rotary machine 4 is a synchronous electric motor using permanent magnet, a voltage equation on the d-axis and q-axis can be represented by expression (1). This expression is developed for the rotation angular frequency ω, to obtain the following expressions (2) and (3).

[Expression 1]

$$\begin{bmatrix} vd \\ vq \end{bmatrix} = \begin{bmatrix} R+sLd & -\omega Lq \\ \omega Ld & R+sLq \end{bmatrix} \begin{bmatrix} id \\ iq \end{bmatrix} + \begin{bmatrix} 0 \\ \omega\phi \end{bmatrix} \quad (1)$$

$$\begin{cases} vd = (R+sLd)id - \omega Lqiq & (*) \\ vq = \omega Ldid + (R+sLq)iq + \omega\phi & (**) \end{cases}$$

[Expression 2]

$$\text{From}(*) \quad \omega = \frac{(R+sLd)id - vd}{Lqiq} \quad (2)$$

$$\text{From}(**) \quad \omega = \frac{vq - (R+sLq)iq}{Ldid + \phi} \quad (3)$$

Here, R is armature resistance, Ld is inductance of the d-axis component, Lq is inductance of the q-axis component, φ is armature interlinkage magnetic flux of the permanent magnet, ω is rotation angular frequency of induced voltage of the AC rotary machine, and s is Laplace operator.

As shown by expressions (2) and (3), there are two calculation expressions for the rotation angular frequency w. In consideration of division by zero, and the like, it is desirable to use expression (3) for the calculation. Here, from expression (3), by using the voltage instruction vq* instead of no-load induced voltage vq of the AC rotary machine, the estimated value ω' of the rotation angular frequency of the induced voltage rotating in synchronization with the magnet position of the permanent magnet motor and the estimated rotation phase θ' can be estimated as shown by expressions (4) and (5).

[Expression 3]

$$\omega' = \frac{vq^* - (R+sLq)iq}{Ldid + \phi} \quad (4)$$

$$\theta' = \int \omega' dt \quad (5)$$

Here, a differential term is included in expression (4). Therefore, for configuring the actual control system, in consideration of noise and the like, it is desirable to use quasi differential as shown by expression (6).

[Expression 4]

$$s \cong \frac{s}{Ts+1} \quad (6)$$

However, expression (1) is a voltage equation for the case where the phase of the AC rotary machine is accurately obtained. Therefore, in a case such as sensorless control where the actual phase cannot be directly detected, phase error between the estimated rotation phase θ' and the actual phase occurs due to error on a constant or the like, and the above expression (1) cannot be appropriately applied. This also holds true for the activation control relevant to an object of the present invention, and therefore expression (1) cannot be applied.

Accordingly, in the activation control, a method for estimating the actual phase even when there is error on a constant will be described below.

In a control system with a position sensor, when current control is performed by instruction values of id*=0 and iq*=0, the voltage instruction values vd* and vq* are calculated from expression (1), as shown by the following expressions.

[Expression 5]

$$vd^* = 0 \quad (7)$$

$$vq^* = \omega\phi \quad (8)$$

Here, if current control is performed with the phase shifted by Δθ, voltage instruction values vd*' and vq*' on the control axis are as shown by the following expressions.

[Expression 6]

$$vd^{*'} = \omega\phi \sin \Delta\theta \quad (9)$$

$$vq^{*'} = \omega\phi \cos \Delta\theta \quad (10)$$

Therefore, Δθ can be calculated as Δθ=arctan(vd*'/vq*'). As shown by expression (11), by performing correction with the Δθ as phase error, the actual rotation phase can be estimated.

[Expression 7]

$$\theta' = \int \omega' dt + \Delta\theta \quad (11)$$

However, in the activation control, if the calculation of expression (11) is performed, the control system may become unstable. Therefore, it is difficult to apply such calculation.

Accordingly, Vcmp is calculated through PI control calculation as shown by expression (12) such that the d-axis voltage instruction becomes zero, and expression (4) is modified as shown by expression (13).

[Expression 8]

$$Vcmp = \text{sign}FR \times G_{Pi}(0 - vd^*) \quad (12)$$

Here
signFR=+1: In case of forward rotation instruction
   −1: In case of reverse rotation instruction

[Expression 9]

$$\omega' = \frac{vq^* + Vcmp - (R+sLq)iq}{Ldid + \phi} \quad (13)$$

Thus, even if error on a constant occurs, the actual rotation angular frequency can be estimated by using estimated rotation angular frequency ω' obtained during the activation control.

Figure 4:
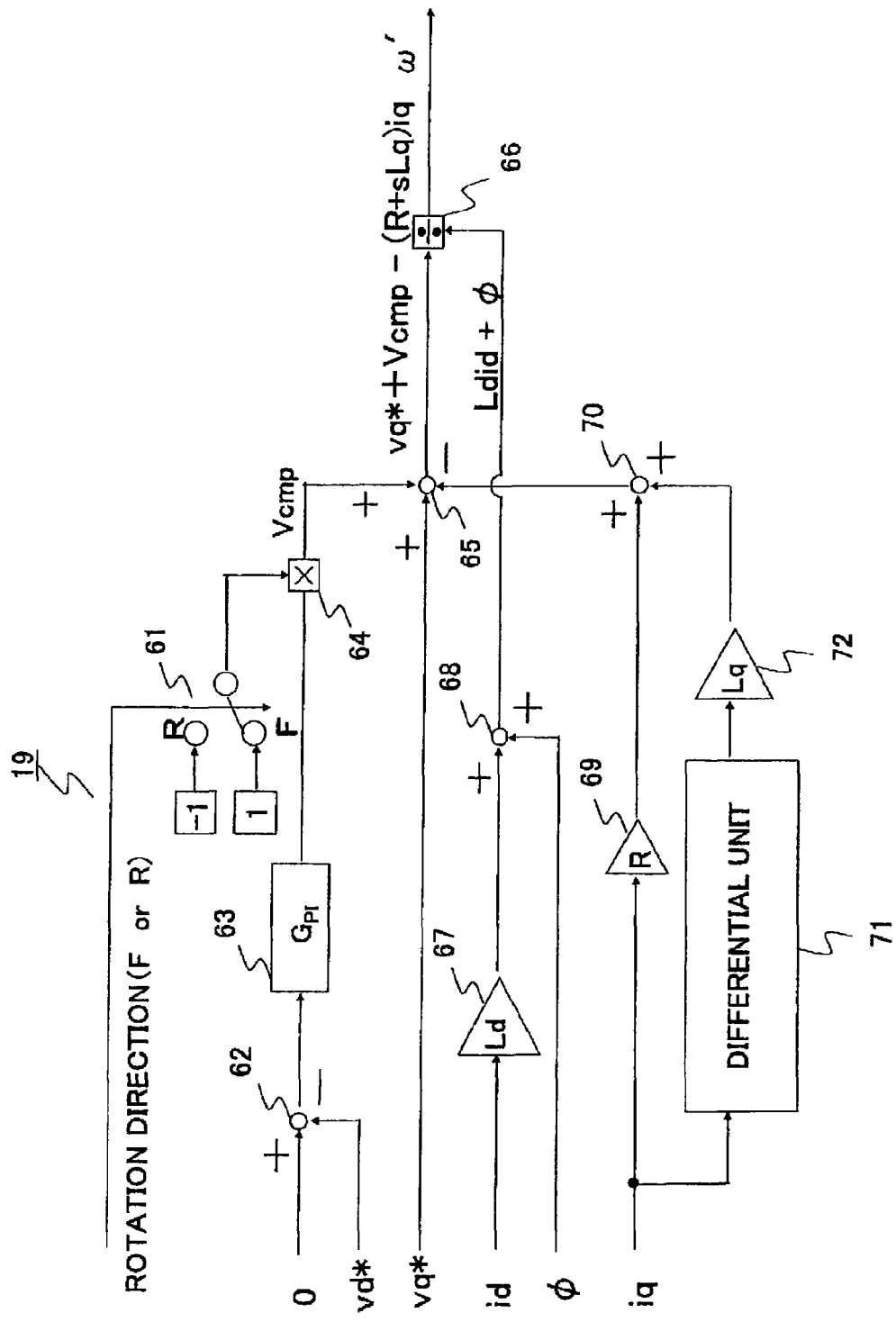
FIG. 4 is a block diagram showing the configuration of a start rotation rate calculation unit of the control apparatus for an AC rotary machine according to embodiment 1 of the present invention.

FIG. 4 is a block diagram of the start rotation rate calculation unit 19 in the case of applying expressions (12) and (13) thereto.

The estimated rotation angular frequency ω' is calculated from the voltage instructions vd* and vq*, the detected currents id and iq, the armature interlinkage magnetic flux φ, and the rotation direction of the AC rotary machine 4, by using a switch unit 61, adder-subtractors 62, 65, 68, and 70, a PI control unit 63, a multiplier 64, a divider 66, proportion units 67, 69, and 72, and a differential unit 71.

Figure 5:
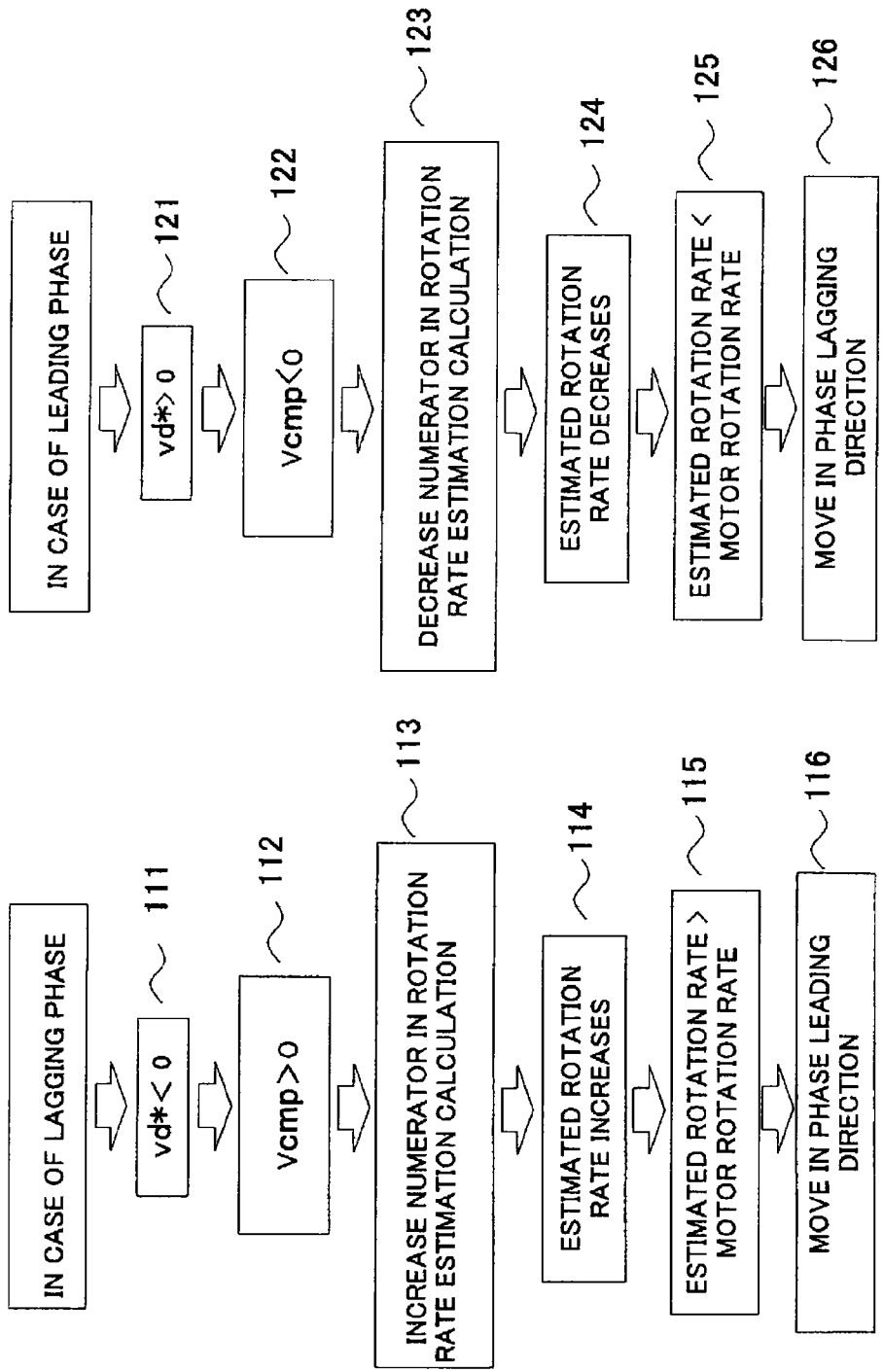
FIG. 5 is a flowchart for explaining the operation of the start rotation rate calculation unit of the control apparatus for an AC rotary machine according to embodiment 1 of the present invention.

FIG. 5 shows the operation in phase correction.

The case of lagging phase will be described with reference to FIG. 4.

From expression (9), if the phase has lagged (Δθ<0), vd* becomes smaller than 0 (step 111 in FIG. 5). As a result, Vcmp becomes larger than 0 through the adder-subtractor 62, the PI control unit 63, and the multiplier 64 in FIG. 4 (step 112 in FIG. 5). Further, the numerator in the rotation rate estimation calculation is increased by the adder-subtractor 65 in FIG. 4 (step 113 in FIG. 5). As a result, the estimated rotation rate calculated by the divider 66 in FIG. 4 increases (step 114 in FIG. 5). As a result, the estimated rotation rate becomes larger than the motor rotation rate (step 115 in FIG. 5), whereby the estimated phase moves in the phase leading direction (step 116 in FIG. 5).

Next, the case of leading phase will be described with reference to FIG. 4.

From expression (9), if the phase has led ($\Delta\theta>0$), vd* becomes larger than 0 (step 121 in FIG. 5). As a result, Vcmp becomes smaller than 0 through the adder-subtractor 62, the PI control unit 63, and the multiplier 64 in FIG. 4 (step 122 in FIG. 5). Further, the numerator in the rotation rate estimation calculation is decreased by the adder-subtractor 65 in FIG. 4 (step 123 in FIG. 5). As a result, the estimated rotation rate calculated by the divider 66 in FIG. 4 decreases (step 124 in FIG. 5). As a result, the estimated rotation rate becomes smaller than the motor rotation rate (step 125 in FIG. 5), whereby the estimated phase moves in the phase lagging direction (step 126 in FIG. 5).

As shown in FIG. 5, if the phase has lagged due to error on a constant, correction is performed so as to cause the phase to lead, and on the other hand, if the phase has led, correction is performed in the phase lagging direction. As a result, the difference between the estimated rotation phase and the actual rotation phase is gradually resolved.

Thus, even if error on a constant occurs, phase estimation robust against error on a constant can be realized. It is noted that as shown in expression (12), the fact that the correction direction of Vcmp reverses depending on the rotation direction should be taken into consideration.

Thus, by configuring the start rotation rate calculation unit 19 based on expressions (12) and (13), it becomes possible to perform activation control robust against error on a constant, thereby allowing stable activation of the AC rotary machine 4.

Next, a method for estimation and setting of the operation start rotation phase will be described.

Figure 6:
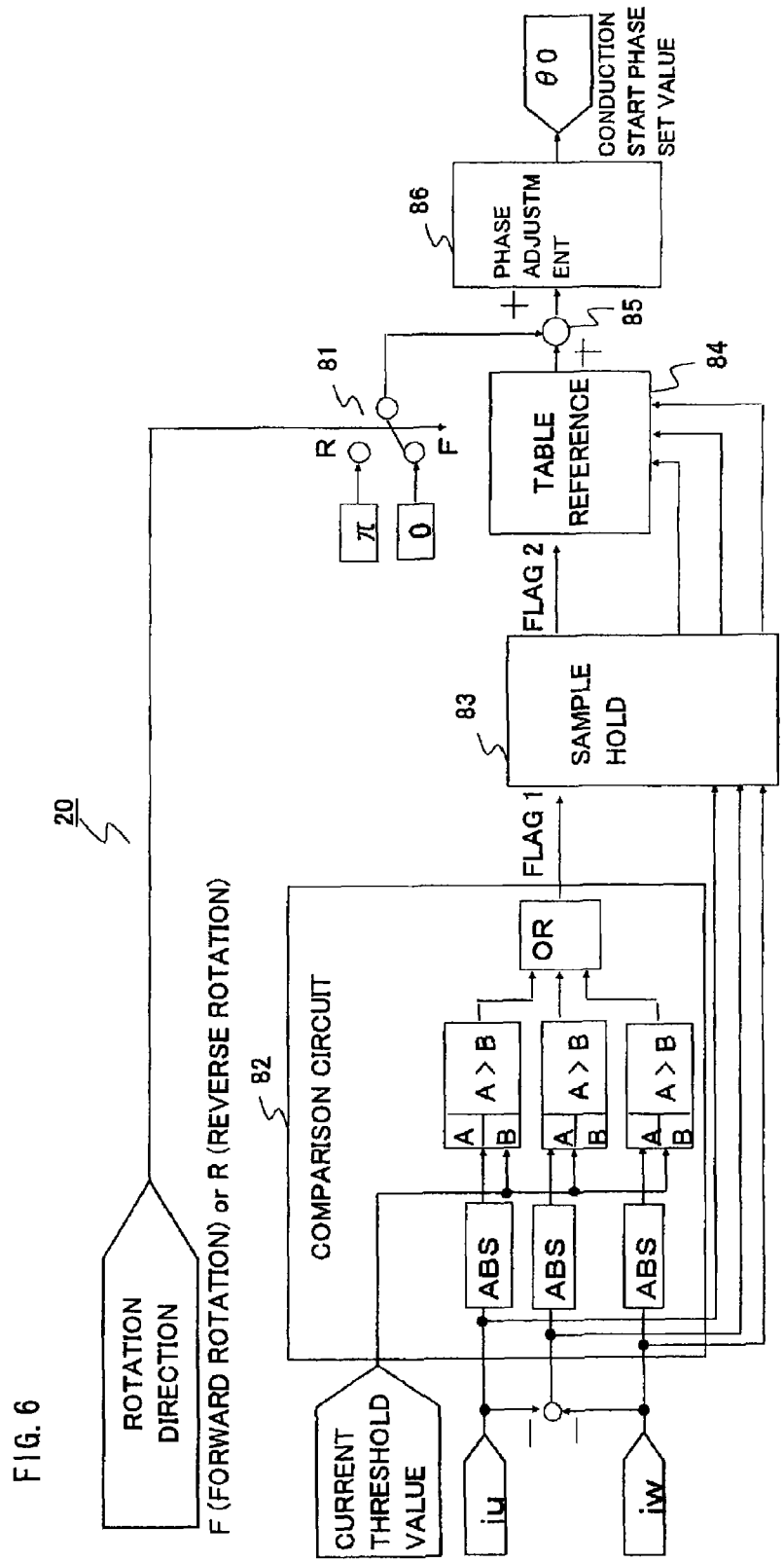
FIG. 6 is a block diagram showing the configuration of a start phase setting unit of the control apparatus for an AC rotary machine according to embodiment 1 of the present invention.

FIG. 6 shows an example of the configuration of the start phase setting unit 20. The start phase setting unit 20 shown in FIG. 6 is configured to output a conduction start rotation phase for the start of activation control, based on the current detected values iu and iw in a rotation coordinate system.

Specifically, the start phase setting unit 20 has a comparison circuit 82 which compares a detected current value and a current threshold value, a sample hold circuit 83, a table reference circuit 84, a switch unit 81, an adder-subtractor 85, and a phase adjustment circuit 86. The comparison circuit 82 detects that one of the phase currents has exceeded the current threshold value, and turns on a flag 1, and the resultant output passes through the sample hold circuit 83. Then, the table reference circuit 84 refers to a table shown in FIG. 7, and the phase adjustment circuit 86 sets a conduction start rotation phase θ0.

Next, the operation of the start phase setting unit 20 shown in FIG. 6 will be described based on FIGS. 7 and 8.

FIG. 7(*a*) is a table showing the relationship between the motor phase and the three-phase AC currents iu, iv, and iw just after the activation control is started in the case where the AC rotary machine 4 rotates in the forward rotation direction. As shown in FIG. 7(*a*), the start rotation phase for the activation control can be divided into six regions based on the signs of the three-phase AC currents, iu, iv, and iw. In addition, FIG. 7(*b*) is a table showing the relationship between the motor phase and the three-phase AC currents iu, iv, and iw just after the activation control is started in the case where the AC rotary machine 4 rotates in the reverse rotation direction. From comparison between FIGS. 7(*a*) and 7(*b*), the characteristics are different depending on the rotation direction. Specifically, the difference of the characteristics is such that one corresponds to the other obtained when the motor phase just after the start of the activation control is shifted by 180 degrees. By using the relationships shown in these tables, the conduction start rotation phase θ0 for the activation control can be set at intervals of ⅙. Therefore, since the activation control is started from a phase closer to the actual phase, unnecessary torque can be reduced.

Figure 8:
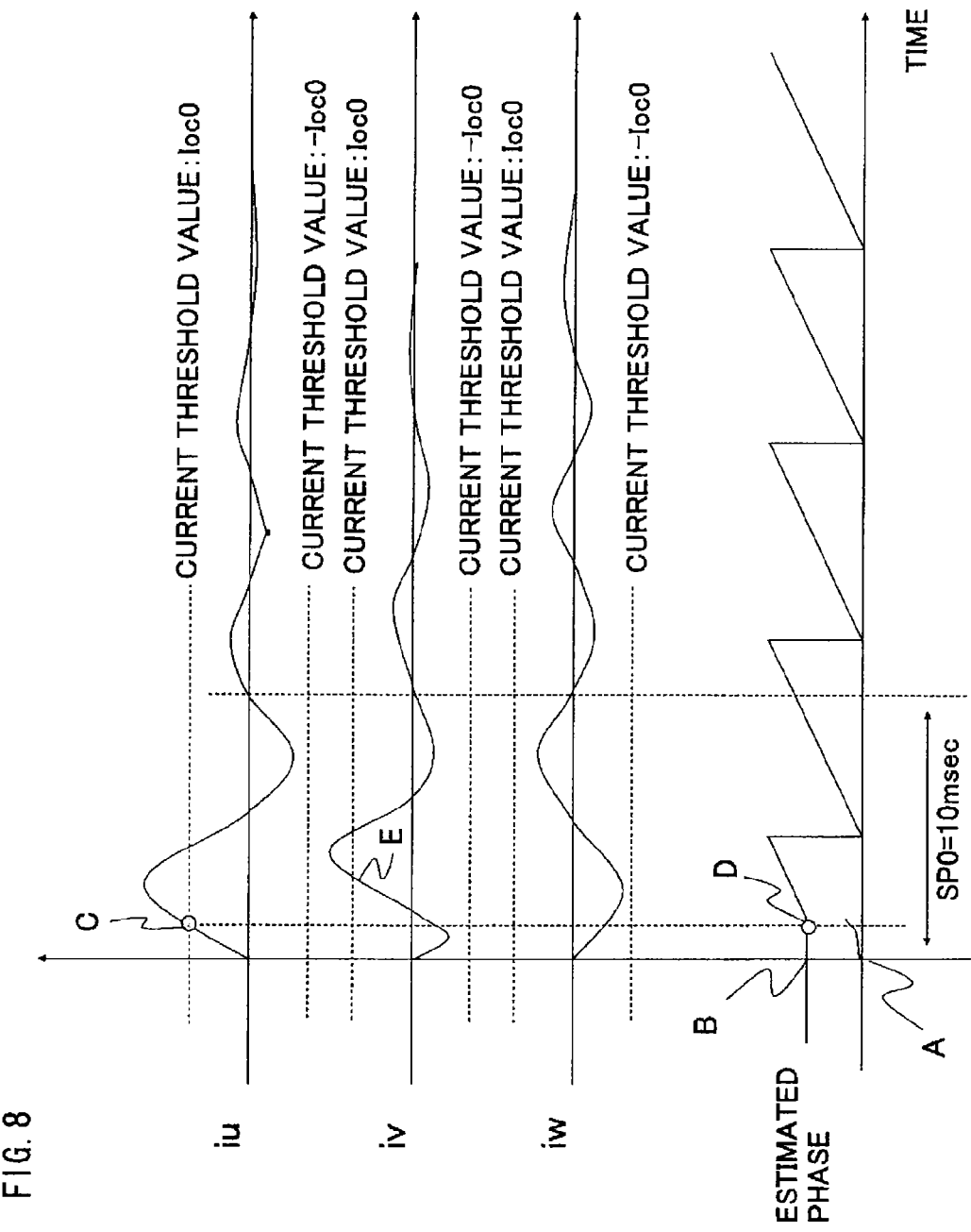
FIG. 8 is a diagram for explaining the operation of the start phase setting unit of the control apparatus for an AC rotary machine according to embodiment 1 of the present invention.

As shown in FIG. 8, at a point A, the activation control (conduction) is started, and the inverter is activated. At this time, since the motor phase is not obtained just after the activation control is started, the conduction start rotation phase is set (the integral value of the integrator is used as the conduction start rotation phase) without changing the control system. Therefore, at a point B, since the estimated rotation phase θ' is not a true value but includes phase error, current flows.

The start phase setting unit 20 detects currents iu and iw of the three-phase AC currents, and at a point C, when one phase current of the three phases has become equal to or larger than a given threshold value Ioc0, turns on flags 1 and 2 shown in FIG. 6. The start phase setting unit 20 refers to the conduction start rotation phase θ0 from the table shown in FIG. 7(*a*) once, and at a point D, sets the conduction start rotation phase θ0 as the start rotation phase of the activation control, for the integrator 16.

At a point E, the current iv is equal to or larger than the threshold value Ioc0, but since the flag 2 of the output of the sample hold circuit 83 does not change, the table is not referred to.

In addition, the table in FIG. 7(*a*) is for the forward rotation direction. Therefore, in the case where the AC rotary machine 4 rotates in the reverse rotation direction, by using the characteristics shifted by 180 degrees from each other depending on the rotation direction, 180 degrees (n rad) is added as a correction value.

In addition, it is assumed that the above rotation direction is obtained in advance by another method.

Thus, the conduction start rotation phase θ0 can be set at intervals of 60 degrees, and the activation control can be started from a phase closer to the actual motor phase. Therefore, the previously-described problems can be solved and the AC rotary machine 4 can be stably activated.

Since the conduction start rotation phase can be set at intervals of 60 degrees, the phase becomes closer to the actual motor phase, but does not perfectly coincide with the actual motor phase, thus leaving phase deviation. The phase deviation is resolved by the start rotation rate calculation unit 19 performing the correction shown in FIG. 5.

A time SP0 [sec] set to be sufficiently shorter than the activation control period SP [sec] is set in advance for the start phase setting unit 20. In the processing by the start phase setting 20, if the time SP0 [sec] has elapsed without any of the phase currents reaching the threshold value Ioc0, it can be considered that, in current-zero control, the rotation state is at a level that does not cause unnecessary disturbance current. Therefore, the phase for the integrator 16 is set at 0, and the activation control is continued as it is. SP0 is set at, for example, 1/10 of SP. In embodiment 1, SP0 is set at about 10 [msec].

Thus, according to embodiment 1, in the activation control by the control apparatus 1 for an AC rotary machine, the start phase setting unit 20 can set the conduction start rotation phase with accuracy of 60-degree interval, based on the behavior of current during a period from the time of activating the power converter 3, which is sufficiently shorter than the activation control period. Therefore, the current amplitude and torque shock just after the activation control is started can be reduced, thereby obtaining the effect of allowing assured and stable reactivation.

In addition, the circuit shown in FIG. 5 which embodies expressions (12) and (13) is applied to the start rotation rate calculation unit 19 described in embodiment 1 so that the d-axis voltage is controlled to be zero. Therefore, the difference between the conduction start rotation phase set by the start phase setting unit 20 and the actual motor phase is gradually resolved, thereby obtaining the effect of allowing activation control robust against error on a constant and stably activating the AC rotary machine 4.

Embodiment 2

Figure 9:
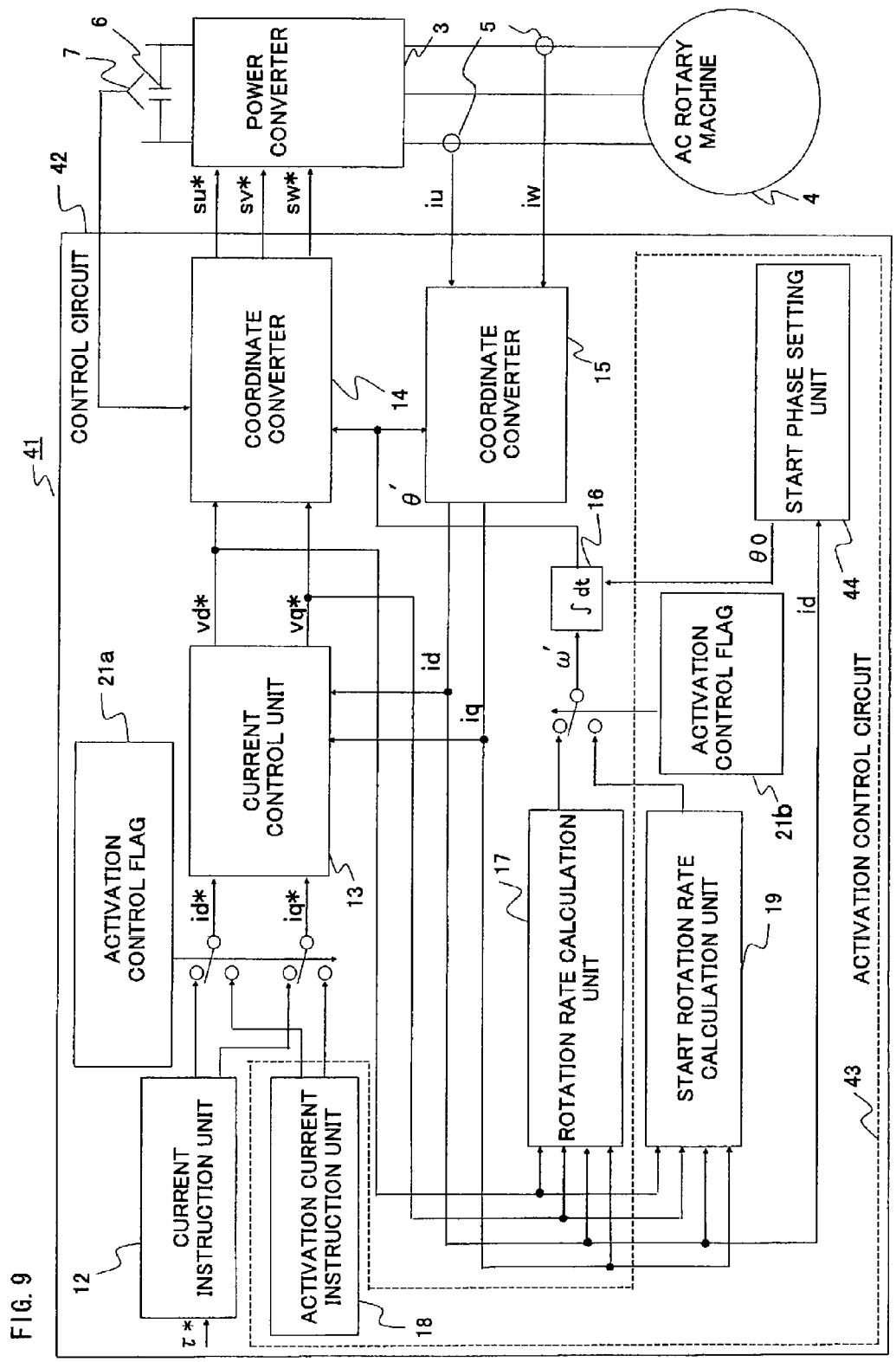
FIG. 9 is a block diagram showing the configuration of a control apparatus for an AC rotary machine according to embodiment 2 of the present invention.
Figure 11:
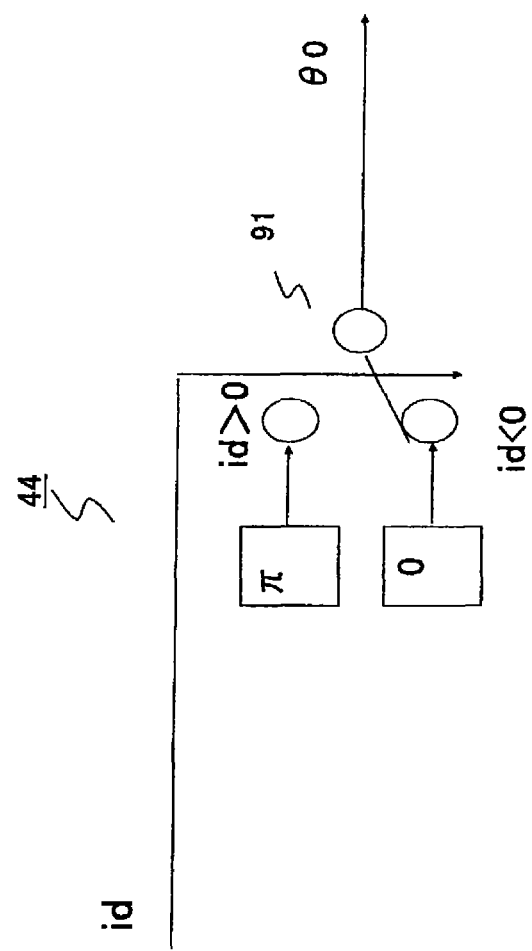
FIG. 11 is a block diagram showing the configuration of the start phase setting unit of the control apparatus for an AC rotary machine according to embodiment 2 of the present invention.

Hereinafter, embodiment 2 of the present invention will be described based on the drawings. FIG. 9 is a configuration diagram of a control apparatus 41 for an AC rotary machine according to embodiment 2 of the present invention. In the drawings, components that are the same as or correspond to those shown in FIG. 1 are denoted by the same reference numerals. In addition, FIGS. 10 and 11 are diagrams for explaining the configuration and operation of a start phase setting unit.

In embodiment 2, the configuration and operation of a start phase setting unit 44 of an activation control circuit 43 in a control circuit 42 are different from those of embodiment 1.

In the control apparatus 41 for an AC rotary machine of embodiment 2, as compared to the configuration of embodiment 1, the input of the start phase setting unit 44 is changed from the detection current values iu and iw on coordinate axes at rest to the detected current id in a rotation coordinate system, and the conduction start rotation phase for starting activation control is set based on the current detected value id.

Since the configuration is the same as that of embodiment 1 except for the start phase setting unit 44, the operation of the start phase setting unit 44 will be described.

FIGS. 10(*a*) and 10(*b*) show the relationship between the motor phase and the detected currents id and iq just after the activation control is started.

FIG. 10(*a*) shows the case where the AC rotary machine 4 rotates forward, and FIG. 10(*b*) shows the case where the AC rotary machine 4 rotates reversely. In order to stably start the activation control, in consideration of rising of the estimated rotation angular frequency, it is desirable to set the conduction start rotation phase θ0 for the activation control so as to lead if the AC rotary machine 4 rotates forward and to lag if the AC rotary machine 4 rotates reversely.

Accordingly, as shown in FIG. 11, the start phase setting unit 44 is configured such that, if the sign of the detected current id for a specific phase is positive, the conduction start rotation phase θ0 is set at 180 degrees (π rad), and if the sign is negative, the phase θ0 is set at 0, by using a switch unit 91.

In the case where the AC rotary machine 4 rotates forward, if the sign of the detected current id is positive, θ0 is set at 180 degrees (π rad), whereby the integrator starts integral calculation from 180 degrees (π rad). Therefore, the activation control is necessarily started from a leading phase. On the other hand, in the case where the AC rotary machine 4 rotates reversely, if the sign of the detected current id is positive, the conduction start rotation phase θ0 is set at 180 degrees (π rad), whereby the activation control is necessarily started from a phase lagging relative to the phase of the AC rotary machine 4. Thus, torque shock can be reduced and stable activation can be realized.

Since the conduction start rotation phase is set at intervals of 180 degrees, phase deviation from the actual motor phase is left. The phase deviation is resolved by the start rotation rate calculation unit 19 performing the correction shown in FIG. 5, as described in embodiment 1.

Thus, according to embodiment 2, in the activation control by the control apparatus 41 for an AC rotary machine, the start phase setting unit 44 can set the initial phase for the activation control so as to lead if the AC rotary machine rotates in the forward direction and to lag if the AC rotary machine rotates in the reverse direction relative to the phase of the AC rotary machine, based on the behavior of the current id during a period from the time of activating the power converter 3, which is sufficiently shorter than the activation control period. Therefore, occurrence of overcurrent and torque shock just after the activation control is started can be reduced, thereby obtaining the effect of allowing assured and stable reactivation.

Embodiment 3

Figure 12:
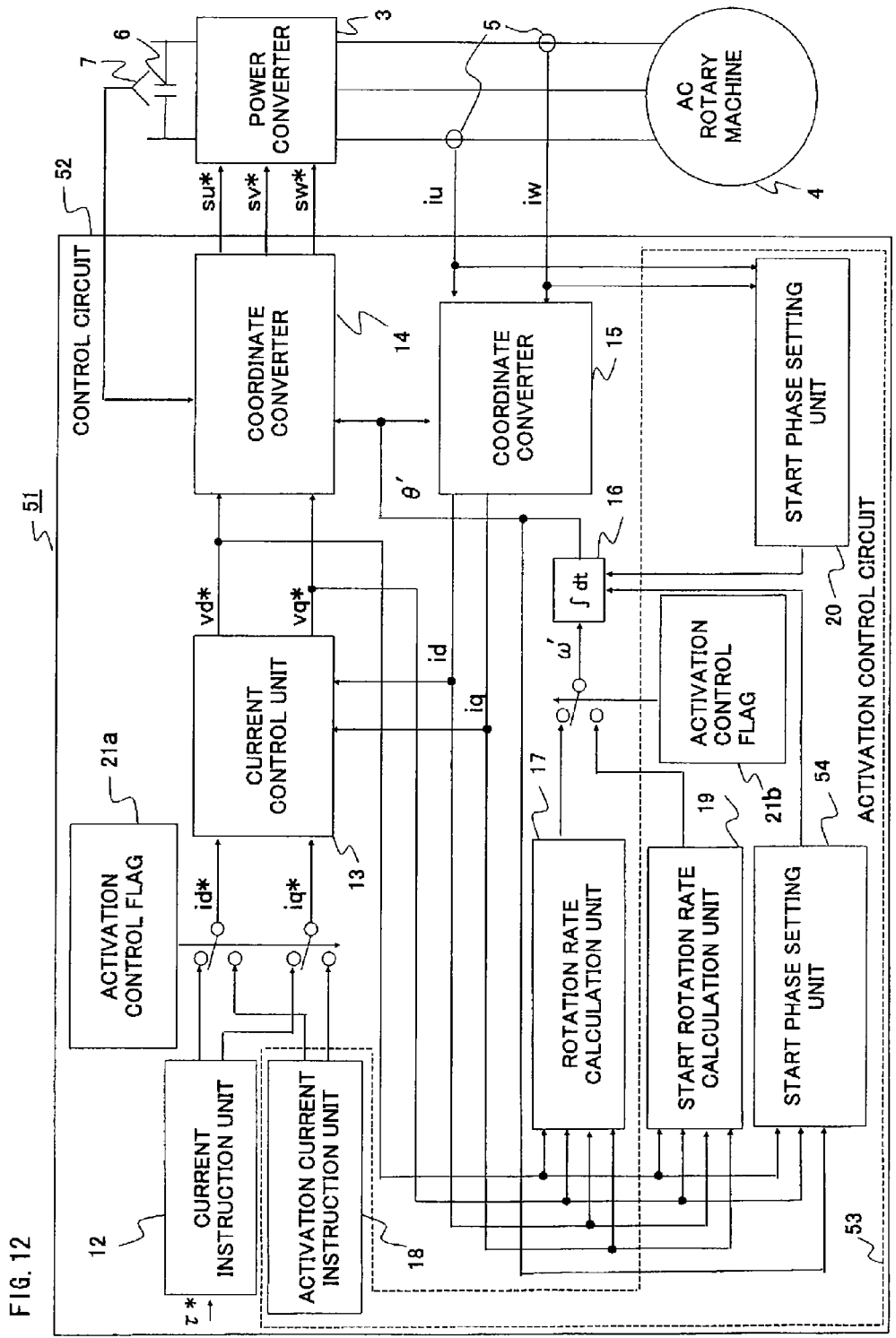
FIG. 12 is a block diagram showing the configuration of a control apparatus for an AC rotary machine according to embodiment 3 of the present invention.
Figure 13:
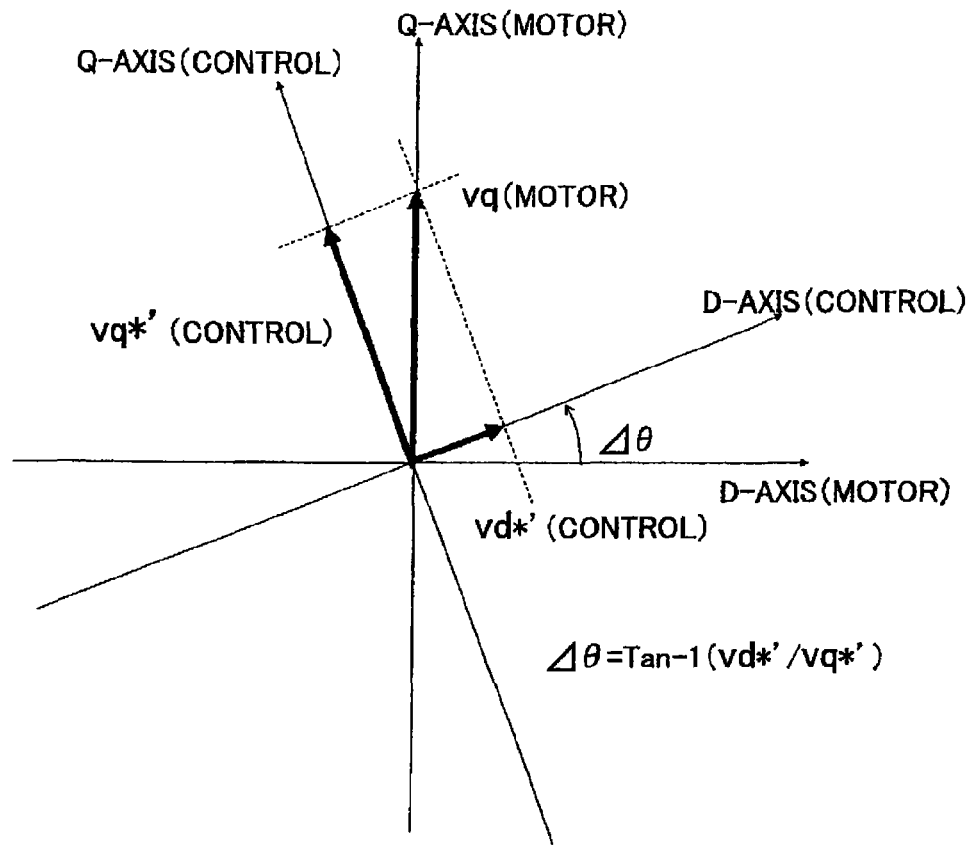
FIG. 13 is a vector diagram showing the theory of a start phase setting unit of the control apparatus for an AC rotary machine according to embodiment 3 of the present invention.
Figure 14:
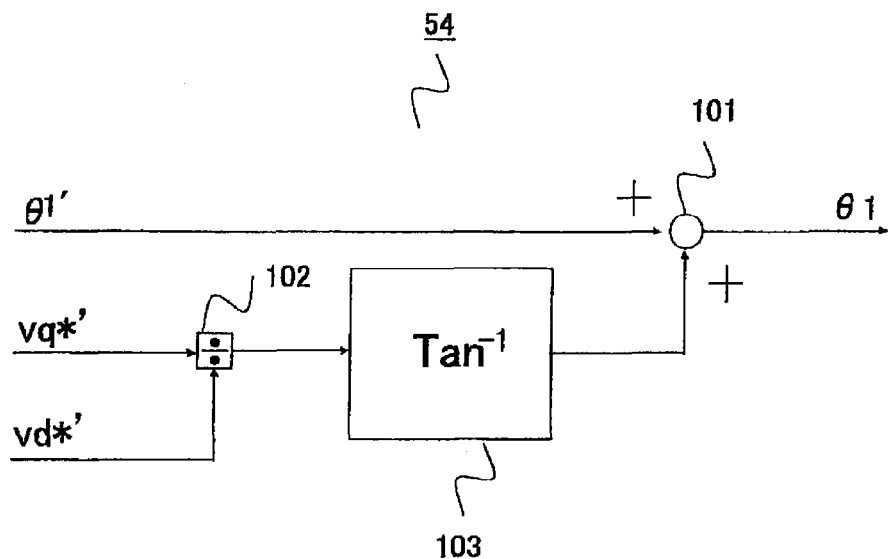
FIG. 14 is a block diagram showing the configuration of the start phase setting unit of the control apparatus for an AC rotary machine according to embodiment 3 of the present invention.

Hereinafter, embodiment 3 of the present invention will be described based on the drawings. FIG. 12 is a configuration diagram of a control apparatus 51 for an AC rotary machine according to embodiment 3 of the present invention. In the drawing, components that are the same as or correspond to those shown in FIG. 1 are denoted by the same reference numerals. In addition, FIGS. 13 to 15 are diagrams for explaining the configuration and operation of a start phase setting unit 54.

In embodiment 3, as compared to the control apparatus 1 for an AC rotary machine of embodiment 1, the start phase setting unit 54 is additionally provided in a activation control circuit 53 of a control circuit 52, thereby enabling switching from activation control to normal sensorless vector control without shock.

Since the configuration is the same as that of embodiment 1 except for the start phase setting unit 54, the operation of the start phase setting unit 54 will be described.

As described in embodiment 1, the AC rotary machine 4 can be stably activated by the activation control. However, in the configuration of the start rotation rate calculation unit 19 shown in FIG. 4, if the signs of the rotation direction and the correction direction of Vcmp are different from each other in the calculation of expression (12) (that is, the rotation direction is opposite to an instruction), the operation start rotation phase estimated by the start rotation rate calculation unit 19 includes error. If the stationary control is started with the phase including the error set as an operation start rotation phase for the stationary control, unnecessary torque current flows and torque shock occurs. In the worst case, excessive current flows and the stationary control cannot be started.

In order to solve the problem caused when the activation control shifts to the stationary control, the start phase setting unit 54 is additionally provided.

Hereinafter, the configuration and operation of the start phase setting unit 54 will be described.

The start phase setting unit 54 operates only in one control cycle period Ts upon shifting to normal sensorless vector control after the activation control period SP is finished.

FIG. 13 shows the relationship between voltage instruction vectors in the case where current-zero control is performed by the activation control. In order to control the current of the AC rotary machine 4 that is rotating so as to be zero, voltage corresponding to no-load induced voltage of the AC rotary machine 4 should be outputted from the power converter 3, only on the Q-axis of the motor axis. However, as shown in FIG. 13, if the current-zero control is performed with the control axis shifted by Δθ from the actual axis, the d-axis voltage instruction vd*' and the q-axis voltage instruction vq*' are outputted on the control axis as shown in FIG. 13. The relationship between the d-axis voltage instruction vd*' and the q-axis voltage instruction vq*' is represented by expressions (14) and (15).

[Expression 10]

$$vd^{*\prime} = vq \sin \Delta\theta \quad (14)$$

$$vq^{*\prime} = vq \cos \Delta\theta \quad (15)$$

Accordingly, the phase error Δθ is calculated by using expression (16) from the voltage instructions vd*' and vq*' in the activation control, and the phase error Δθ is added to the estimated rotation phase θ1' at the time of shifting from the activation control to the stationary control obtained by the activation control, as shown by expression (17). Thus, the operation start rotation phase θ1 for the stationary control is calculated, and the phase θ1 is set as the operation start rotation phase of the stationary control, for the integrator 16.

[Expression 11]

$$\Delta\theta = \arctan(vd^{*\prime}/vq^{*\prime}) \quad (16)$$

$$\theta1 = \theta1' + \Delta\theta \quad (17)$$

FIG. 14 shows a configuration example of the start phase setting unit 54.

The operation start rotation phase θ1 is calculated from the voltage instructions vd* and vq* and the estimated rotation phase θ1' through an adder-subtractor 101, a divider 102, and a calculation unit 103.

Next, a series of operations in the activation control of embodiment 3 will be described based on FIG. 15.

In FIG. 15, variation in the actual phase is indicated by a dotted line, and variation in the estimated rotation phase is indicated by a solid line.

During a certain period from reactivation of the inverter, the control apparatus 51 for an AC rotary machine of embodiment 3 performs the activation control described in embodiment 1, before performing stationary sensorless vector control.

In a specific operation in the activation, first, conduction is started by receiving an operation instruction at a point A, the start phase setting unit 20 operates at a point B, and then the conduction start rotation phase θ0 is set based on current obtained just after the start of conduction, at a point C.

Thereafter, while conduction is started, in the activation control, the amplitude of the AC voltage is adjusted such that the AC phase current has a predetermined current amplitude, and at the same time, the rotation angular frequency and the rotation phase of the AC rotary machine are estimated based on the detected current and the voltage instruction.

Then, upon shifting to the stationary control, at a point D, the activation control flag changes so that the activation control shifts to the stationary control, and the start phase setting unit 54 operates. The start phase setting unit 54 calculates the actual rotation phase θ1 of the AC rotary machine from the estimated rotation phase angle θ1' and the voltage instruction at the time of shifting from the activation control to the stationary control, and then at a point E, sets the phase θ1.

A torque instruction rises after the stationary control is started.

It is noted that also the configuration where the start phase setting unit 54 is additionally provided in the activation control circuit 11 of the control apparatus 41 for an AC rotary machine of embodiment 2 can obtain the same effect as in the control apparatus 51 for an AC rotary machine of embodiment 3.

Thus, according to embodiment 3, upon switching from the activation control to the stationary control by the control apparatus 51 for an AC rotary machine, even if there is error between the estimated rotation phase and the actual rotation phase, the operation start rotation phase for stationary control can be appropriately set, whereby the inverter can be smoothly reactivated. Therefore, even just after the start of conduction or just after the start of stationary operation, occurrence of excessive current or torque shock can be prevented, whereby the effect of allowing assured and stable reactivation is obtained.

INDUSTRIAL APPLICABILITY

The present invention relates to position sensorless inverter control, particularly, activation control for an AC rotary synchronous machine using permanent magnet, and is applicable to various control apparatuses for an AC rotary machine.

The invention claimed is:

1. A control apparatus for an AC rotary machine, the control apparatus comprising:
    a control circuit which generates a voltage instruction based on a current instruction and generates a switching instruction based on the voltage instruction;
    a power converter which generates AC voltage having controlled amplitude and controlled angular frequency, based on the switching instruction; and
    a current detector which detects AC phase current flowing in the AC rotary machine driven by the output of the power converter, wherein
    the control circuit performs, for the AC rotary machine in free-run state, activation control of activating the power converter to activate the AC rotary machine, and has a start phase setting unit which sets a rotation phase at the start of the activation control, based on the rotation direction of the AC rotary machine at the start of the activation control and on the polarity of the current detected by the current detector at the start of the activation control.

2. The control apparatus for an AC rotary machine according to claim 1, wherein at the start of the activation control, the start phase setting unit selects one of six phases that cause an initial estimated rotation phase to lead, based on the rotation direction of the AC rotary machine and on the polarity of the current for each phase detected by the current detector, and sets the selected phase as the initial rotation phase.

3. The control apparatus for an AC rotary machine according to claim 1, wherein at the start of the activation control, the start phase setting unit selects one of two phases that cause an initial estimated rotation phase to lead, based on the rotation direction of the AC rotary machine and on the polarity of the current for a specific phase detected by the current detector, and sets the selected phase as the initial rotation phase.

4. The control apparatus for an AC rotary machine according to claim 1, wherein the control circuit has
    a start rotation rate calculation unit which, in an activation control period from the time of activating the power converter until a predetermined period elapses, performs PI control using the difference between a d-axis voltage instruction and zero as the input for the PI control, and estimates a rotation angular frequency of the AC rotary machine, based on a calculation result of the PI control, the current detected by the current detector, and a q-axis voltage instruction.

5. The control apparatus for an AC rotary machine according to claim 4, wherein the control circuit further has a start phase setting unit which calculates, at the time of shifting to stationary control after the activation control is finished, a rotation phase at the start of the stationary control, from a ratio of two-axis voltage instruction values during the activation control and an estimated rotation phase calculated during the activation control.

6. An activation control method for an AC rotary machine, which performs, for the AC rotary machine in free-run state, activation control of activating a power converter to activate the AC rotary machine, the activation control method executing:

a first step of setting a rotation phase at the start of the activation control, based on the rotation direction of the AC rotary machine at the start of the activation control and on the polarity of AC phase current flowing in the AC rotary machine at the start of the activation control, and activating the power converter which drives the AC rotary machine; and a second step of, in an activation control period from the time of activating the power converter until a predetermined period elapses, performing PI control using the difference between a d-axis voltage instruction and zero as the input for the PI control, and estimating a rotation angular frequency of the AC rotary machine, based on a calculation result of the PI control, the AC phase current flowing in the AC rotary machine, and a q-axis voltage instruction.

7. The activation control method for an AC rotary machine according to claim 6, the activation control method further executing a third step of calculating, at the time of shifting to stationary control after the activation control is finished, a rotation phase at the start of the stationary control, from a ratio of two-axis voltage instruction values during the activation control period and an estimated rotation phase calculated during the activation control period.

* * * * *